【12】 United States Patent
Young

(10) Patent No.: US 6,760,633 B1
(45) Date of Patent: Jul. 6, 2004

(54) METHOD AND APPARATUS FOR PREDICTING STABILITY OF A CLOSED LOOP APPARATUS

(76) Inventor: Chris Morrow Young, 945 W. Yellow Jacket, Rockwall, TX (US) 75087

( * ) Notice: Subject to any disclaimer, the term of this patent is extended or adjusted under 35 U.S.C. 154(b) by 923 days.

(21) Appl. No.: 09/609,044

(22) Filed: Jun. 30, 2000

(51) Int. Cl.$^7$ .............................................. G05B 13/02
(52) U.S. Cl. ............................ 700/44; 700/37; 700/45; 700/47; 700/28; 703/14; 702/57; 702/60; 702/65; 324/650; 324/707; 324/709; 318/561
(58) Field of Search ............................ 700/28, 37, 44, 700/45, 46, 47, 52, 53; 703/14; 702/65, 57, 60; 318/561; 324/650, 709, 707

(56) References Cited

U.S. PATENT DOCUMENTS

| | | | |
|---|---|---|---|
| 2,123,178 A | | 7/1938 | Bode .......................... 179/171 |
| 5,296,794 A | * | 3/1994 | Lang et al. .................. 318/715 |
| 5,567,227 A | * | 10/1996 | Henderson ...................... 95/22 |
| 5,818,245 A | * | 10/1998 | Allfather ..................... 324/707 |
| 6,054,867 A | * | 4/2000 | Wakamatsu .................. 324/650 |
| 6,281,650 B1 | * | 8/2001 | Yutkowitz .................... 318/561 |
| 6,519,538 B1 | * | 2/2003 | Bowman et al. .............. 702/65 |

OTHER PUBLICATIONS

H.W. Bode, "Relations Between Attenuation and Phase in Feedback Amplifier Design"; Bell System Technical Journal, Jul. 1940.
V. Joseph Thottuvelil and George C. Verghese, "Analysis and Control Design of Parallelled DC/DC Converters With Current Sharing"; IEEE Transactions on Power Electronics; Jul., 1998.
H. Nyquist, "Regeneration Theory"; Bell System Technical Journal, Jan. 1932.
Allen F. Rozman and Kevin J. Foellhoelter, Circuit Considerations for Fast, Sensitive, Low–Voltage Loads in a Distributed Power System, APEC 1995 Conference Proceedings, 1995.

\* cited by examiner

*Primary Examiner*—Ramesh Patel
(74) *Attorney, Agent, or Firm*—Law Office of Donald D. Mondul

(57) ABSTRACT

A method for predicting stability of a closed loop apparatus is disclosed. The closed loop apparatus has an open loop impedance and at least one inherent internal gain. The method comprises the steps of: (a) identifying an impedance scaling factor associated with the closed loop apparatus that may be expressed in terms including the open loop impedance, the at least one inherent internal gain, a gain variable and a phase variable; (b) vectorally establishing a first scaling value for the impedance scaling factor as a function of frequency while maintaining a first variable of the gain variable and the phase variable at a first working value to record the first scaling value for a plurality of frequencies. The method may include the further steps of: (c) vectorally establishing a second scaling value for the impedance scaling factor as a function of frequency while maintaining a second variable of the gain variable and the phase variable at a second working value to record the second scaling value for a plurality of frequencies. The apparatus comprises a first reference tool relating the first scaling value with the second variable of the gain variable and the phase variable as a function of frequency. The apparatus may further comprise a second reference tool relating the second scaling value with the first variable of the gain variable and the phase variable as a function of frequency.

24 Claims, 5 Drawing Sheets

METHOD AND APPARATUS FOR PREDICTING STABILITY OF A CLOSED LOOP APPARATUS

BACKGROUND OF THE INVENTION

The present invention is directed to a method and apparatus for predicting stability characteristics of power supplies or other closed loop systems under arbitrary load conditions. The present invention is particularly directed to a method for predicting stability characteristics for direct current, DC-to-DC, power supplies.

When designing certain systems, such as power supply, or power converter circuits, one must take into account the potential user's load characteristics. This consideration is especially important in the design of DC-DC converters because such converters are generally configured as a closed loop system that monitors its output, provides feedback indicating its output, and employs the feedback to adjust to maintain a constant DC output. In any feedback system, it is of significant importance that the feedback loop be stable. A simple example of an unstable feedback loop is the loud tone produced in the presence of audio feedback when a microphone is placed too close to a speaker producing signals originating at the microphone.

Today's electronic devices are more and more designed to be faster, smaller, and more reliable. This trend for product requirements is especially evident in portable electronic devices such as cellular telephones, electronic games, and portable computers. Some practical design consequences of this trend are that output voltages for DC-DC converters are getting lower and the stability of output of DC-DC converters is more difficult to attain for certain loads or applications.

The fact that a user's load characteristics figure so intimately in stability of DC-DC converter circuits, and the ever more stringent requirements for greater stability at lower voltages for modem electronic circuits have made present ways of predicting stability of a particular DC-DC converter circuit for a particular application uneconomical and not particularly reliable or accurate.

Nyquist developed criteria to assess the stability of a control loop ("Regeneration Theory", H. Nyquist, Bell System Technical Journal, January 1932). Bode ("Relations Between Attenuation and Phase in Feedback Amplifier Design", Bell System Technical Journal, July 1940) expressed these criteria in terms of the phase ($\phi$) and gain of a transfer function. According to this analysis, if gain (dB) and phase change ($\Delta\phi$) of the loop gain are zero at the same frequency in a circuit, the circuit will be unstable.

As a practical engineering measure, one must design a circuit having $\geq 45°$ phase margin to reliably have a stable circuit. Phase margin is the value of phase when gain as a function of frequency crosses through zero from positive to negative. Thus, when gain is 0 dB, and gain is passing from positive to negative, phase must be $\geq 45°$ in order for the circuit under consideration to be stable with adequate margin.

Another measure of stability is to require that gain margin be $\geq -7$ to $-10$ dB. That is, when phase as a function of frequency crosses through zero, gain must be at least 7–10 dB in order that the circuit under consideration will be a stable circuit.

Presently, manufacturers of power supplies, and especially of DC-DC converters, use simulations, or laboratory measurements, or closed form analytical expressions, or all three of those methods for determining whether a particular circuit is stable with a particular load. Simulations are expensive in that they occupy large amounts of computer capacity and time. Closed form analytical expressions rely on simplifying assumptions that introduce significant errors. Laboratory measurements are an expensive approach to answering questions about a particular circuit-load stability in terms of human time and computer assets involved. Further, neither simulations, closed form analytical expressions nor laboratory experimentation are particularly accurate in predicting stability of converter apparatuses under various load conditions.

One result of ongoing efforts to predict stability with arbitrary loads is that manufacturers of power converters must essentially custom-tailor their products to user's loads on a case-by-case basis. Such a "job shop" approach to production precludes one's taking advantage of the economies of scale which could be enjoyed if a manufacturer could predict which loads were amenable to stable use with particular converters. That is, if manufacturers could predict stability for a particular converter circuit for a particular load without having to physically evaluate the converter circuit with the particular load, then the inefficiencies of customizing converter circuits for each discrete load criterion may be avoided. Manufacturers enjoying such an advantage in predictability of stability of their products vis-á-vis loads may produce converter apparatuses for "off-the-shelf" availability to customers with evaluation tools enabling customers to select which of the converters will accommodate the particular loads they are designing.

There is a need for a method for predicting stability characteristics of power converters under arbitrary load conditions. This need is particularly acute in predicting stability characteristics of DC-DC power converter circuits.

It would be particularly useful if stability characteristics of power supply apparatuses could be predicted without having to test the power supply apparatus under the particular load condition for which a stability determination is desired.

The method of the present invention allows evaluation of the stability of a power supply apparatus for various load conditions without having to recharacterize the apparatus for each given load.

SUMMARY OF THE INVENTION

A method for predicting stability of a closed loop apparatus is disclosed. The closed loop apparatus has an open loop impedance and at least one inherent internal gain. The method comprises the steps of: (a) identifying an impedance scaling factor associated with the closed loop apparatus that may be expressed in terms including the open loop impedance, the at least one inherent internal gain, a gain variable and a phase variable; (b) vectorally establishing a first scaling value for the impedance scaling factor as a function of frequency while maintaining a first variable of the gain variable and the phase variable at a first working value to record the first scaling value for a plurality of frequencies. The method may include the further steps of: (c) vectorally establishing a second scaling value for the impedance scaling factor as a function of frequency while maintaining a second variable of the gain variable and the phase variable at a second working value to record the second scaling value for a plurality of frequencies. The apparatus comprises a first reference tool relating the first scaling value with the second variable of the gain variable and the phase variable as a function of frequency. The apparatus may further comprise a second reference tool relating the second scaling value with the first variable of the gain variable and the phase variable as a function of frequency.

The stability of a controlled apparatus, that is an apparatus with regeneration or feedback, such as a regulated power supply, power converter, amplifier or other closed loop apparatus, is an important, if not critical, consideration in any application of that apparatus. Measures of the stability or potential stability of a controlled apparatus include the phase margin and the gain margin. Preferably, both the phase margin and the gain margin of an apparatus are considered in evaluating the stability of the apparatus. Such margin measures are an indication of how close the control system or the loop response of that apparatus is to instability. The loop response itself is a function of the load placed on the output of such an apparatus.

The conventional approach to evaluate or determine the margins of such an apparatus has been to generate a Bode plot of the loop response for a specific load condition. By inspection of such a Bode plot one may determine the value of the margin of the apparatus being evaluated for that specific load condition. In the case where the load is to be designed appropriately to maintain the apparatus in a stable condition during operation, the conventional approach has resulted in a time consuming process of iterations of load adjustments, Bode plot generation for each adjustment, inspection and readjustment. By such iterative employment of the conventional approach, one may step-wise ascertain a load that permits stable operation of an apparatus.

The preferred embodiment of the present invention produces a response plot of a closed loop apparatus that is not dependent on the load characteristics with which the apparatus is to be employed for the basic plot generation. As a result, the same plot can be used to determine the operating margin of the apparatus characterized by the plot for any variation of the load with which the apparatus is to be employed. Such a load-independent evaluation method can significantly reduce the effort of characterizing the response of a power supply apparatus for a given load.

Features of the present invention will be apparent from the following specification and claims when considered in connection with the accompanying drawings, in which like elements are labeled using like reference numerals in the various figures, illustrating the preferred embodiment of the invention.

DETAILED DESCRIPTION OF THE INVENTION

Figure 1:
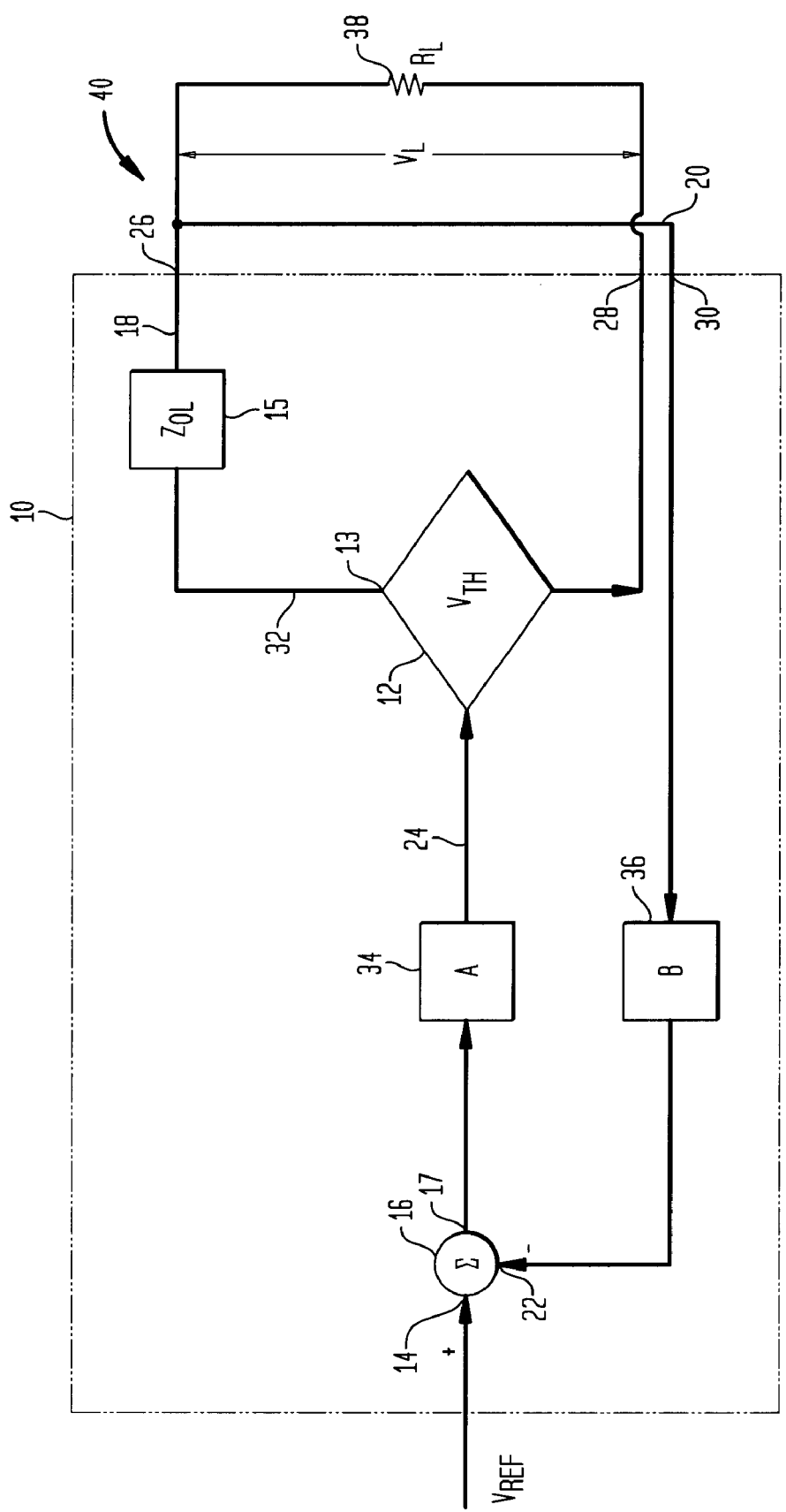
FIG. 1 is an electrical schematic diagram of a power converter apparatus connected with a resistive load.

FIG. 1 is an electrical schematic diagram of a power converter apparatus connected with a resistive load. Thottuvelil and Verghese characterized a power converter using the power converter apparatus of FIG. 1 as a Thevenin voltage source model in their paper setting forth a small-signal stability analysis of paralleled DC-DC converter systems. (See, V. Joseph Thottuvelil and George C. Verghese; "Analysis and Control Design of Paralleled DC/DC Converters with Current Sharing"; IEEE Transactions on Power Electronics, Vol. 13, No. 4; July 1998.).

In principle, the load indicated in FIG. 1 could as well be a complex load. A resistive load is used to illustrate the method of the present invention in connection with FIG. 1 to simplify the explanation. In FIG. 1, a power converter apparatus 10 includes a Thevenin voltage source 12 providing a voltage $V_{TH}$ and connected in series with an open-loop output impedance 15. Open-loop output impedance 15 has a value of $Z_{OL}$. Converter apparatus 10 has two output loci, or terminals 26, 28 and a sense locus, or terminal 30. Output terminals 26, 28 are connected with an output circuit 40. Output circuit 40 includes a resistive load 38 connected across output terminals 26, 28. Resistive load 38 has a value $R_L$.

A reference voltage $V_{REF}$ is applied to a positive input node 14 of a difference generator 16. Difference generator 16 also receives, at a negative input node 22, a feedback signal multiplied by a gain stage 36 having a gain B, via a sense line 20 from output side 18 of open-loop output impedance 15 via output terminal 26 and via sense terminal 30. The difference between reference voltage $V_{REF}$ at positive input node 14 and the feedback signal at negative input node 22 is provided as a control signal by difference generator 16 from an output node 17 via a line 24 subject to a gain A, represented by a box 34, to control Thevenin voltage source 12. The control signal provided from output node 17 of difference generator 16 keeps Thevenin voltage source 12 generating a signal having a voltage value $V_{TH}$. Thevenin voltage source 12 provides voltage $V_{TH}$ to open-loop impedance 15 from an output node 13 via a line 32. Gain A, represented schematically at box 34, is the gain from output node 17 of difference generator 16 to output node 13 of Thevenin voltage source 12. Gain A and Gain B are inherent internal gains of power converter apparatus 10. Gain A does not include the effect of open-loop output impedance 15, or any external load impedances. Gain B, represented schematically at box 36, is the gain from sensed voltage at output terminal 26 to negative input node 22 of difference generator 16.

In a power supply apparatus such as power converter apparatus 10 illustrated in FIG. 1, an important design objective is to limit variations in $V_L$ relative to $V_{REF}$. The variation of $V_L$ with respect to $V_{REF}$ is given by the equation:

$$\frac{V_o}{V_R} = \frac{\gamma A}{1 + \gamma AB} \quad [1]$$

where $\gamma$ is given by:

$$\gamma = \frac{Z_L}{Z_L + Z_{OL}} \quad [2]$$

where $Z_{OL}$ is open loop impedance;

$Z_L$ is load impedance (illustrated as resistive load $R_L$ in FIG. 1).

The second term of the denominator of Equation [1], in conventional control theory, is recognized as the loop gain. That is, the loop gain (LG) is given by the equation:

$$LG = AB \frac{Z_L}{Z_L + Z_{OL}} \quad [3]$$

It is important to recognize that the loop gain is a function of load impedance $Z_L$. As a consequence, any time load impedance $Z_L$ is changed, loop gain is changed.

Figure 2:
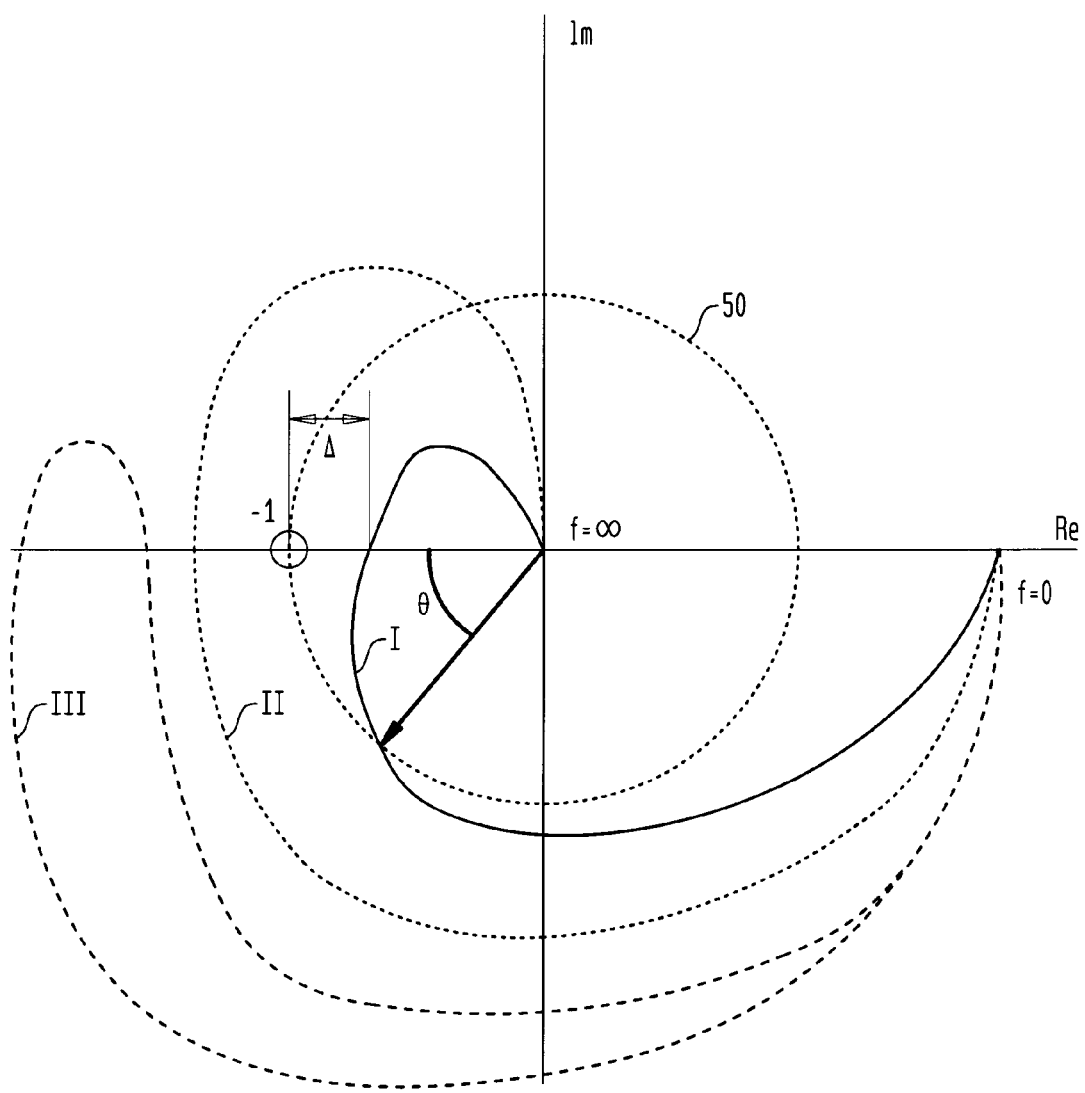
FIG. 2 is an exemplary Nyquist Plot of real and imaginary parts of loop gain in a closed loop apparatus.

FIG. 2 is an exemplary Nyquist Plot of real and imaginary parts of loop gain in a closed loop apparatus. In general, loop gain is a complex function; that is, a function containing real and imaginary components. In 1932, Nyquist (*Bell System Technical Journal*, January 1932) introduced a graphical means of observing or characterizing the stability of control loops. FIG. 2 illustrates such a "Nyquist Plot". Nyquist found that as the real (Re) and imaginary (Im) parts of the loop gain of a system were plotted as a function of frequency (f) from zero to infinity, if the resulting curve did not contain "−1" (as represented by curve I in FIG. 2), then the system would be stable. If the resulting curve did contain "−1" (as represented by curve II in FIG. 2), the system would be unstable. This is consistent with Equation [1]; if the term γAB=−1, the expression goes to ∞. Such a condition indicates instability. A resulting curve of the sort represented by curve III in FIG. 2 was said to be conditionally stable.

The "gain margin" of a system is defined as the distance along the real (Re) axis between "−1" and the loop gain curve intersection with the real (Re) axis. The "phase margin" of a system is defined as the angle between the real (Re) axis and the intersection of the loop gain curve with unit gain circle 50. That is, gain margin is measured at a locus at which phase margin is 0°, and phase margin is measured at a locus at which gain margin is 1. Thus, for example in FIG. 2, curve I will have a gain margin of Δ, and will have a phase margin of θ.

As a system response approaches −1 on the real axis Re, oscillations within the system increase; that is, system instability increases. Such oscillations, or perturbations, may be caused by such influences as thermal noise, load changes (occasioned by, for example, thermal effects, on/off switching, and changes in switching states), switching noise or other influences.

System designers seeking to design systems that operate robustly and reliably generally observe system design rules to provide for stable system operation. These design rules are intended to allow for such factors as manufacturing variances, degradation of components with time, thermal variance, and other factors. Generally accepted system design rules for power supply apparatuses require phase margin ≧45°, and gain margin ≧−7 to −10 dB.

Figure 3:
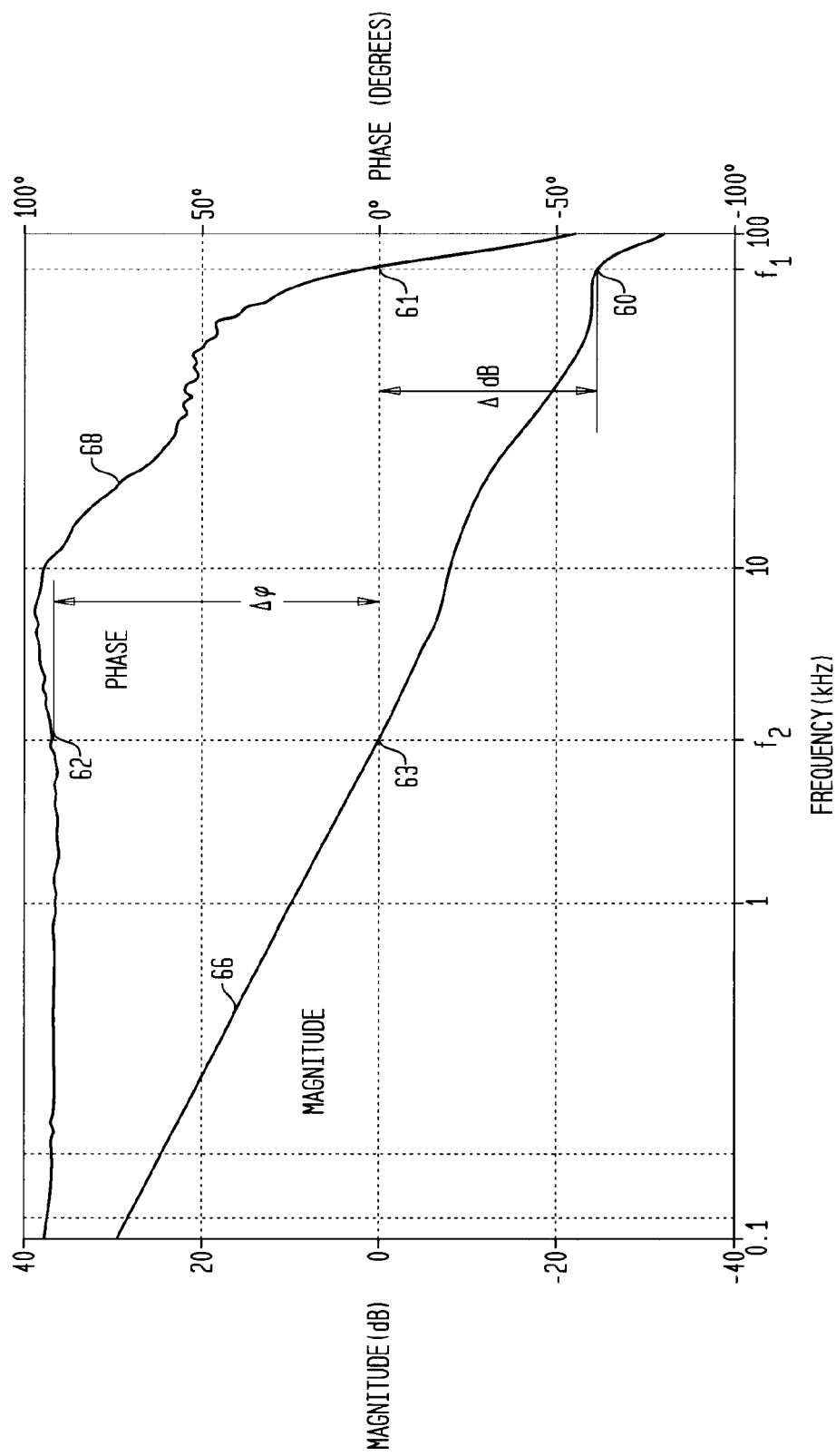
FIG. 3 is an exemplary Bode Plot of magnitude and phase of loop gain plotted as a function of frequency for a closed loop apparatus.

FIG. 3 is an exemplary Bode Plot of magnitude and phase of loop gain plotted as a function of frequency for a closed loop apparatus. In 1940, Bode (*Bell System Technical Journal*, July 1940), introduced another graphical method that is used to evaluate system stability. Bode's method is also covered in U.S. Pat. No. 2,123,178.

In FIG. 3 a "Bode plot" is illustrated in which magnitude 66 (in dB) and phase 68 (in degrees) of loop gain of an exemplary system are plotted as a function of frequency (in kHz). In the Bode Plot of FIG. 3, the gain margin ΔdB is defined as the gain where phase is zero degrees (i.e., at point 61). Thus, gain margin ΔdB is indicated at point 60 on the magnitude plot 66 of FIG. 3, at frequency $f_1$. The phase margin Δφ is defined as the phase where the gain is unity or 0 dB (i.e., at point 63). Thus, phase margin Δφ is indicated at point 62 on the phase plot 68 of FIG. 3, at frequency $f_2$.

In practice, the difficulty with Nyquist Plots (FIG. 2) and Bode Plots (FIG. 3) is that loop gain (LG) changes with changes in load ($Z_L$). Because loop gain (LG) changes, the plots (Nyquist Plots and Bode Plots) also change with changes in load ($Z_L$). So, as load ($Z_L$) is adjusted, a new Nyquist Plot or Bode Plot must be generated in order to evaluate the system with the new load ($Z_L$). This is a tedious and time consuming process.

Figure 4:
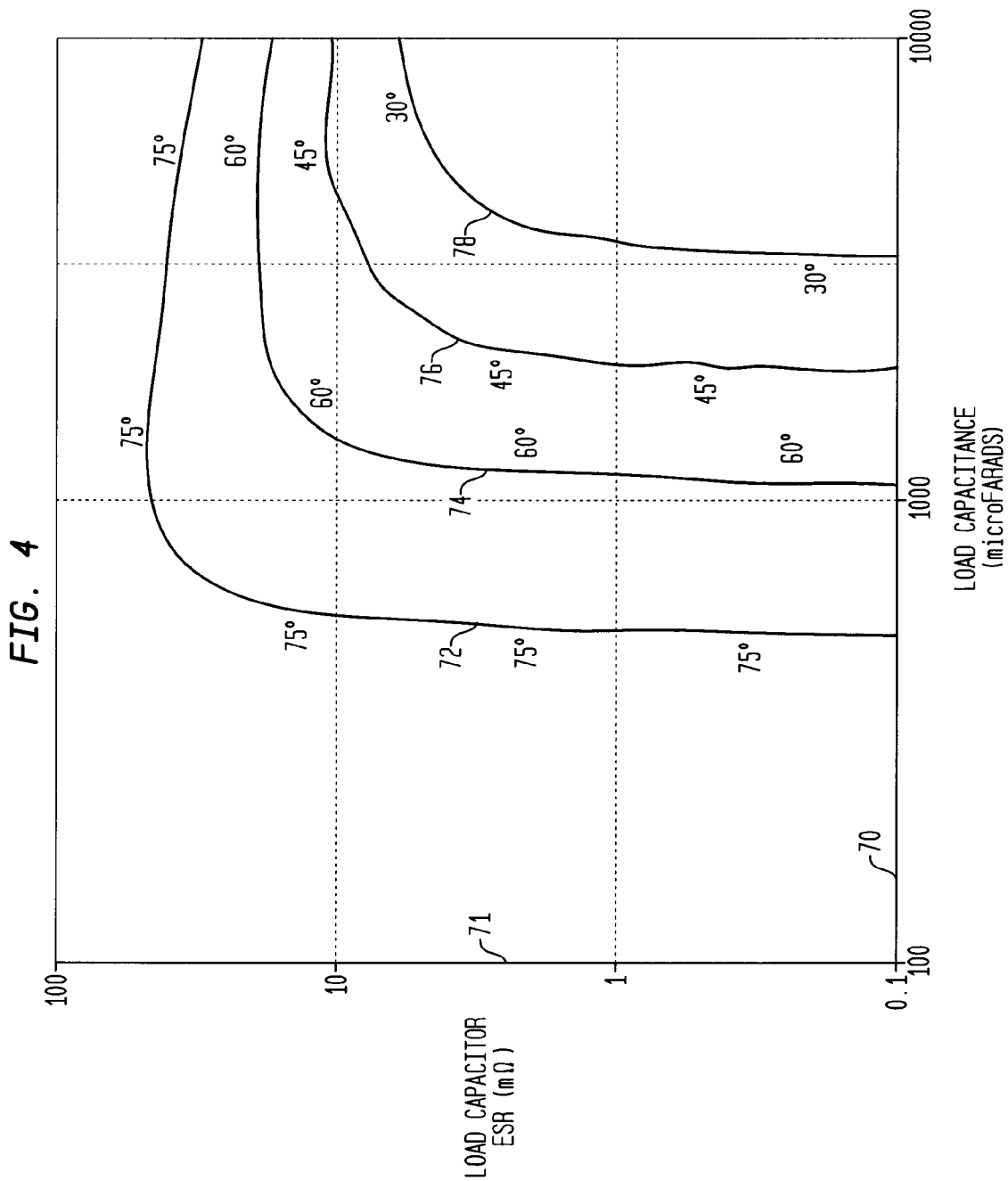
FIG. 4 is an exemplary plot of contours of constant phase margin plotted on axes representing complex load impedance of a closed loop apparatus in terms of capacitance and equivalent series resistance.

FIG. 4 is an exemplary plot of contours of constant phase margin plotted on axes representing complex load impedance of a closed loop apparatus in terms of capacitance and equivalent series resistance.

In 1995, Rozman and Fellhoelter, ("Circuit Considerations for Fast, Sensitive, Low-Voltage Loads in a Distributed Power System", APEC 1995 Conference Proceedings, pg. 34) recognized the difficulty in the tedious application of Nyquist Plots and Bode Plots in evaluating stability of closed loop apparatuses, such as power supply apparatuses, for different loads. Rozman and Fellhoelter introduced another graphical method for evaluating system stability.

Rozman and Fellhoelter assumed that the significant part of load impedance $Z_L$ can be described as a capacitor having a capacitance C and an equivalent series resistance ESR. In FIG. 4, a representative Rozman and Fellhoelter Plot is a contour plot wherein the two axes are a horizontal axis 70 relating to load capacitance C and a vertical axis 71 relating to equivalent series resistance ESR. Contour lines represent loci of constant phase margin Δφ.

Thus, in FIG. 4, loci of a constant phase margin of 75° are represented by a curve 72. Loci of a constant phase margin of 60° are represented by a curve 74. Loci of a constant phase margin of 45° are represented by a curve 76. Loci of a constant phase margin of 30° are represented by a curve 78.

Rozman and Fellhoelter further contemplated a similar two-dimensional plot on axes relating to capacitance C and equivalent series resistance ESR establishing contour lines representing loci of constant gain margin. A plot of loci of constant gain margin according to the teachings of Rozman and Fellhoelter is considered within the understanding of one skilled in the art relevant to the subject matter of the present application. In the interest of avoiding prolixity, such a representative plot is not included in this application.

The Rozman and Fellhoelter Plots (loci of constant phase margin and loci of constant gain margin) are an efficient method for quickly determining the stability of a system in terms of gain margin or phase margin, given the capacitance C and equivalent series resistance ESR of a load. The disadvantage of this approach is that its requisite configuration of the load is too inflexible. That is, the Rozman and Fellhoelter Plot is restricted to loads that can be fairly characterized by a capacitor C and an associated equivalent series resistance ESR. Real world loads are often too complex to be accurately approximated, or represented by a capacitor C and an associated equivalent series resistance ESR. For example, some loads may include different types or values of capacitors in parallel, some loads may exhibit different responses at different temperatures, and some loads may exhibit different responses at different frequencies. Such differences in load configuration involve complicating factors precluding accurate approximation of load response by a simple capacitance C and equivalent series resistance ESR.

The present inventor has concluded that stability analysis focuses on particular operating conditions. For example, the present inventor concluded that phase margin analysis does not need to be evaluated for a range of values of gain.

Instead, phase margin analysis need only be concerned with loop gains equal to unity. Similarly, gain margin analysis need only be concerned with operations at 0° phase.

As is evident with a Bode Plot (FIG. 3), if one looks solely at the unity gain point (FIG. 3, point 63), the resulting phase is defined as the phase margin Δϕ (FIG. 3, point 62). For gain margin analysis, one is only concerned with the point of zero phase margin (FIG. 3, point 61). In FIG. 3, the resulting negative gain is the gain margin ΔdB, as indicated at point 60.

In view of such a recognition that the only relevant loci of concern in evaluating phase margin and gain margin of a system are, respectively, loci of unity gain and zero phase, Equation [3] may be employed to define an important new term:

$$LG = AB\frac{Z_L}{Z_L + Z_{OL}} = Ge^{j\theta} \qquad [4]$$

where G is the magnitude of the gain and $e^{j\theta}$ accounts for phase margin (θ). Equation [4] can be rewritten as:

$$Z_L = \frac{Z_{OL}}{\left[\frac{AB}{G}e^{-j\theta} - 1\right]} \qquad [5]$$

It is important to note that Equation [5] has all load information on one side of the equal sign, and all other information on the other side of the equal sign.

Figure 5:
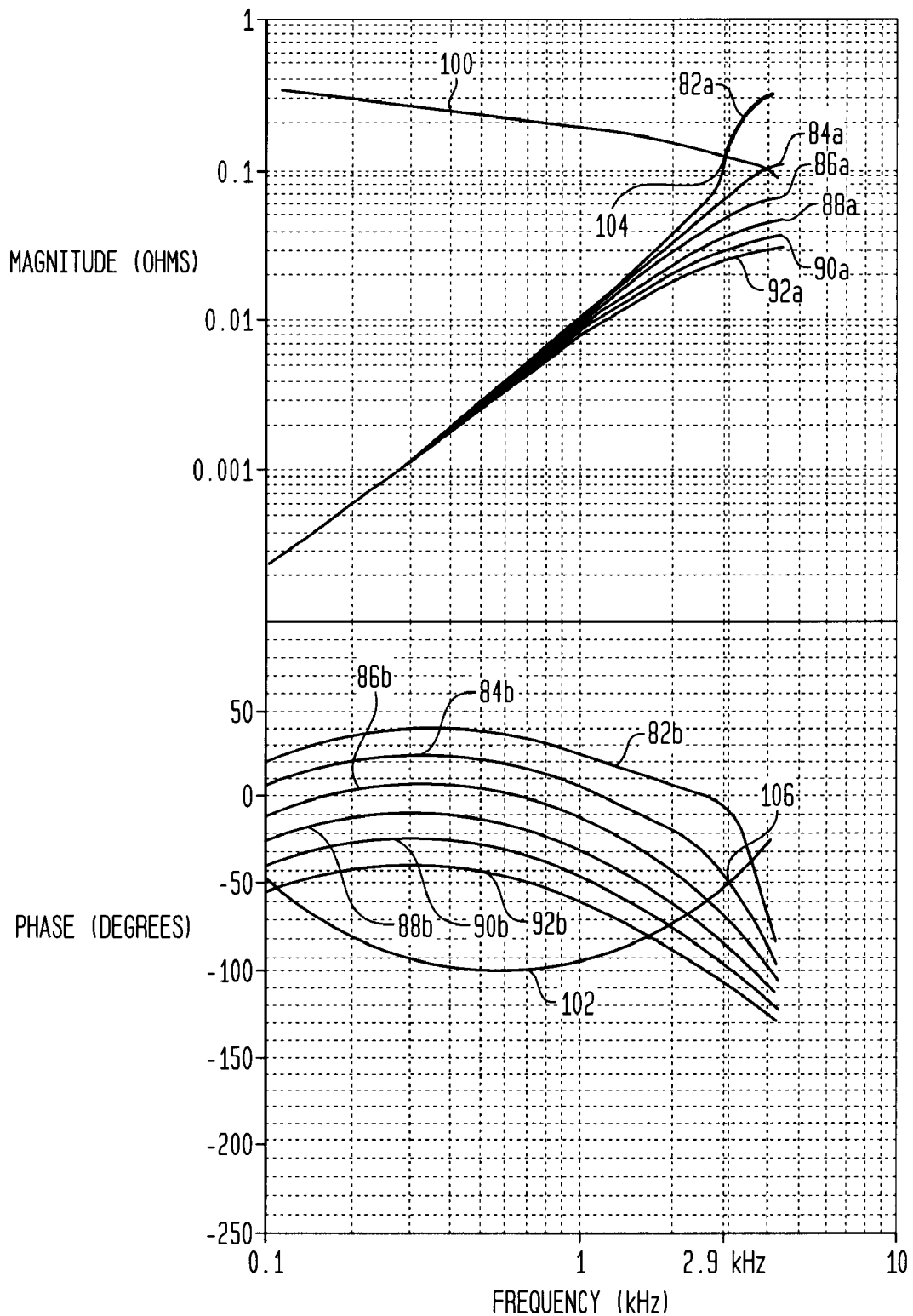
FIG. 5 is an exemplary plot generated according to the preferred embodiment of the method of the present invention.

The present invention, as it is employed for evaluating phase margin of a system, plots the right side of Equation [5] with gain magnitude G=1 (i.e., at a unity gain) in terms of magnitude and phase as a function of frequency. Multiple curves are generated on the same graph representing steps in values of phase margin. The steps in phase margin may be equal or not equal. The present inventor has determined that equal steps in phase margin plotting are preferred in order to facilitate interpolative employment of the plots for evaluation of a system vis-à-vis a particular load. FIG. 5 is one example of a reference tool based upon a vectoral determination of the right hand side of Equation [5] to determine magnitude and phase response of a system as a function of frequency, with gain magnitude G=1.

FIG. 5 is an exemplary plot generated according to the preferred embodiment of magnitude and phase characteristics of the right side of Equation [5] for a particular system, such as a power supply apparatus, is presented. The response curves developed and plotted in FIG. 5 are independent of load characteristics of the system. Thus, FIG. 5 is a phase margin evaluative tool.

A gain margin graphic evaluative tool may be similarly produced. In such a case, the present invention plots the right side of Equation [5] in terms of magnitude and phase as a function of frequency, with phase margin held at a value of 0°. Multiple curves, on the same graph are generated representing steps in values of gain margin. The steps in gain margin may be equal or not equal. The present inventor has determined that equal steps in gain margin plotting are preferred in order to facilitate interpolative employment of the plots for evaluation of a system vis-à-vis a particular load.

For ease of reference, the right hand side of Equation [5] will be referred to hereinafter as a Margin Function. When the magnitude and phase of the right hand side of Equation [5] is determined for a system, with gain magnitude G=1, the Margin Function will be referred to as a Phase Margin Function. When the magnitude and phase of the right hand side of Equation [5] is determined, with phase=0°, the Margin Function will be referred to as a Gain Margin Function.

In FIG. 5, Phase Margin Functions are plotted for an array of phase margin values. A Phase Margin Function indicating magnitude as a function of frequency for a phase margin of 90° is plotted as response curve 82a; a Phase Margin Function indicating phase for a phase margin of 90° is plotted as response curve 82b. A Phase Margin Function indicating magnitude as a function of frequency for a phase margin of 75° is plotted as response curve 84a; a Phase Margin Function indicating phase for a phase margin of 75° is plotted as response curve 84b. A Phase Margin Function indicating magnitude as a function of frequency for a phase margin of 60° is plotted as response curve 86a; a Phase Margin Function indicating phase for a phase margin of 60° is plotted as response curve 86b. A Phase Margin Function indicating magnitude as a function of frequency for a phase margin of 45° is plotted as response curve 88a; a Phase Margin Function indicating phase for a phase margin of 45° is plotted as response curve 88b. A Phase Margin Function indicating magnitude as a function of frequency for a phase margin of 30° is plotted as response curve 90a; a Phase Margin Function indicating phase for a phase margin of 30° is plotted as response curve 90b. A Phase Margin Function indicating magnitude as a function of frequency for a phase margin of 15° is plotted as response curve 92a; a Phase Margin Function indicating phase for a phase margin of 15° is plotted as response curve 92b.

Other reference tools maybe produced representing similar vectoral exercising of the right side of Equation [5] to facilitate utility of the information thereby gleaned. Examples of such alternate embodiments of reference tools include multidimensional vectoral tables and other arrays of data resulting from such a vectoral exercising of the right side of Equation [5]. Such reference tools, including multidimensional vectoral tables, may be maintained on-line within a computer device for facilitating mathematical or other algorithmic manipulation and evaluation of the data contained within the reference tool.

As an example of a use of the reference tool illustrated in FIG. 5, one may evaluate phase margin response of a system with a particular load by plotting the load magnitude response curve 100 and load phase response curve 102 for the particular test load on the phase margin evaluative tool illustrated in FIG. 5. Load magnitude response curve 100 intersects Phase Margin Function curve 82a (indicating Phase Margin Function magnitude when gain magnitude G=1; Equation [5]) at a locus 104. Locus 104 occurs at a sample frequency substantially equal to a value of 2.9 kHz. Applying that sample frequency value (2.9 kHz) to Phase Margin Function curves 82b, 84b, 86b, 88b, 90b, 92b (indicating Phase Margin Function phase when gain magnitude G=1; Equation [5]) one may observe that the sample frequency (2.9 kHz) intersects load phase response curve 102 at a locus 106. Locus 106 is situated between Phase Margin Function curves 84b, 86b. Interpolating between Phase Margin Function curves 84b, 86b one may conclude that the system has a phase margin slightly less than 75°, approximately 73°, when employed with the particular load represented by load magnitude response curve 100 and load phase response curve 102.

The reference tool embodied in FIG. 5 enables quick evaluation of system response with a given load to determine whether the system will meet design criteria (e.g., phase margin ≧45°; gain margin ≧−7 to −10 dB) when employed with the given load. No reconstruction of the evaluative tool (FIG. 5) is necessary to conduct an evaluation of the system with another load. Similar flexibility and ease of use is afforded by gain margin evaluative tools created using the method of the present invention.

There are at least two key advantages provided by the method and apparatus of the present invention over prior art conventional approaches previously described in connection with FIGS. 2–4. First, the evaluation tool does not need to be reconstructed or changed in order to evaluate iterations or changes in the load to be employed with the system. The evaluation tool may be employed to evaluate any load that can be characterized in terms of a frequency dependent magnitude and phase. Second, the evaluation tool gives a "fingerprint" that is characteristic of that particular power supply, amplifier or other closed loop apparatus for any load condition. This advantage is particularly useful, for example, in comparing power supply systems in order to determine which system may be better suited for handling a particular load. In such a situation, plots of the two (or more) power supplies can be quickly and straightforwardly compared to determine which power supply would be more stable for a given load condition.

The method and apparatus of the present invention are important design tools that can be used to determine whether or not a particular power supply or other closed loop apparatus is appropriate for an application, or whether a given load will be stable with a particular power supply. In the past, such evaluative determinations have required extensive system evaluations to iteratively determine whether one particular apparatus or another apparatus would more suitably accommodate a particular load. Such evaluations were often conducted by the apparatus manufacturer based upon load characterizations provided by the customer. Significant delays in development were experienced by customers in awaiting evaluation results from the manufacturer.

The load-independent characteristics of the method and apparatus of the present invention are of particular value because the method and apparatus of the present invention facilitate evaluation of apparatuses vis-á-vis particular loads by the customer without any need to await evaluations and testing by the manufacturer.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A method for predicting stability of a closed loop apparatus, said closed loop apparatus having an open loop output impedance and at least one inherent internal gain; the method comprising the steps of:
   (a) identifying an impedance scaling factor associated with said closed loop apparatus; said impedance scaling factor being expressed in terms of said open loop output impedance, said at least one inherent internal gain, a gain variable and a phase variable;
   (b) determining a response of said impedance scaling factor as a function of frequency while maintaining one variable of said gain variable and said phase variable at a value.

2. A method for predicting stability of a closed loop apparatus as recited in claim 1 wherein the method comprises the further step of:
   (c) creating a reference tool relating said impedance scaling factor and the other variable of said gain variable and said phase variable than said one variable as a function of frequency.

3. A method for predicting stability of a closed loop apparatus as recited in claim 2 wherein said reference tool is created in a multidimensional graphic form.

4. A method for predicting stability of a closed loop apparatus as recited in claim 2 wherein said reference tool is created as a multidimensional vectoral table.

5. A method for predicting stability of a closed loop apparatus as recited in claim 4 wherein said multidimensional vectoral table is maintained on-line.

6. A method for predicting stability of a closed loop apparatus, said closed loop apparatus having an open loop impedance and at least one inherent internal gain; the method comprising the steps of:
   (a) identifying an impedance scaling factor associated with said closed loop apparatus; said impedance scaling factor being expressed in terms including said open loop impedance, said at least one inherent internal gain, a gain variable and a phase variable;
   (b) vectorally establishing a scaling value for said impedance scaling factor as a function of frequency while maintaining one variable of said gain variable and said phase variable at a working value to record said scaling value for a plurality of frequencies.

7. A method for predicting stability of a closed loop apparatus as recited in claim 6 wherein the method comprises the further step of:
   (c) creating a reference tool relating said impedance scaling factor and the other variable of said gain variable and said phase variable than said one variable as a function of frequency.

8. A method for predicting stability of a closed loop apparatus as recited in claim 7 wherein said reference tool is created in a multidimensional graphic form.

9. A method for predicting stability of a closed loop apparatus as recited in claim 7 wherein said reference tool is created as a multidimensional vectoral table.

10. A method for predicting stability of a closed loop apparatus as recited in claim 9 wherein said multidimensional vectoral table is maintained on-line.

11. A method for predicting stability of a closed loop apparatus, said apparatus having an open loop impedance and at least one inherent internal gain; the method comprising the steps of:
   (a) identifying an impedance scaling factor associated with said closed loop apparatus; said impedance scaling factor being expressed in terms including said open loop impedance, said at least one inherent internal gain, a gain variable and a phase variable;
   (b) vectorally establishing a first scaling value for said impedance scaling factor as a function of frequency while maintaining a first variable of said gain variable and said phase variable at a first working value to record said first scaling value for a plurality of frequencies;
   (c) vectorally establishing a second scaling value for said impedance scaling factor as a function of frequency while maintaining a second variable of said gain variable and said phase variable at a second working value to record said second scaling value for a plurality of frequencies.

12. A method for predicting stability of a closed loop apparatus as recited in claim 11 wherein the method comprises the further step of:

(d) creating a first reference tool relating said first scaling value with said second variable of said gain variable and said phase variable as a function of frequency;

(e) creating a second reference tool relating said second scaling value with said first variable of said gain variable and said phase variable as a function of frequency.

13. A method for predicting stability of a closed loop apparatus as recited in claim 12 wherein at least one of said first reference tool and said second reference tool is created in a multidimensional graphic form.

14. A method for predicting stability of a closed loop apparatus as recited in claim 12 wherein at least one of said first reference tool and said second reference tool is created as a multidimensional vectoral table.

15. A method for predicting stability of a closed loop apparatus as recited in claim 14 wherein said multidimensional vectoral table is maintained on-line.

16. An apparatus for predicting stability of a closed loop device; said closed loop device having an open loop output impedance and at least one inherent internal gain; the apparatus comprising a reference tool relating a first scaling value of an impedance scaling value associated with said closed loop apparatus with a first variable of a gain variable and a phase variable as a function of frequency; said impedance scaling factor being expressed in terms including said open loop impedance, said at least one inherent internal gain, a gain variable and a phase variable; said first scaling value being vectorally established as a function of frequency while maintaining a second variable of said gain variable and said phase variable at a first working value to record said first scaling value for a plurality of frequencies.

17. An apparatus for predicting stability of a closed loop device as recited in claim 16 wherein said reference tool further relates a second scaling value of said impedance scaling value associated with said closed loop device with a second variable of a gain variable and a phase variable as a function of frequency; said second scaling value being vectorally established as a function of frequency while maintaining a first variable of said gain variable and said phase variable at a second working value to record said second scaling value for a plurality of frequencies.

18. An apparatus for predicting stability of a closed loop device as recited in claim 16 wherein said reference tool is created in a multidimensional graphic form.

19. An apparatus for predicting stability of a closed loop device as recited in claim 16 wherein said reference tool is created as a multidimensional vectoral table.

20. An apparatus for predicting stability of a closed loop device as recited in claim 19 wherein said multidimensional vectoral table is maintained on-line.

21. An apparatus for predicting stability of a closed loop device as recited in claim 17 wherein said reference tool is created in a multidimensional graphic form.

22. An apparatus for predicting stability of a closed loop device as recited in claim 17 wherein said reference tool is created as a multidimensional vectoral table.

23. An apparatus for predicting stability of a closed loop device as recited in claim 22 wherein said multidimensional vectoral table is maintained on-line.

24. An apparatus for predicting stability of a closed loop device with a load; said closed loop device having an open loop output impedance and at least one inherent internal gain; the apparatus comprising a reference tool relating a first scaling value of an impedance scaling value associated with said closed loop device with a first design variable relating to said closed loop apparatus, said impedance scaling factor being expressed in terms independent of said load; said first scaling value being vectorally established as a function of frequency while maintaining other design variables than said first design variable at at least one working value to record said first scaling value for a plurality of frequencies.

* * * * *